United States Patent [19]

Mason

[11] 3,714,586

[45] Jan. 30, 1973

[54] MODEM CARRIER DETECTING CIRCUIT

[76] Inventor: Edwin E. Mason, 1133 Hillside Avenue, Harrisburg, Ohio

[22] Filed: May 18, 1971

[21] Appl. No.: 144,540

[52] U.S. Cl. ..................325/487, 325/319, 325/410, 178/88

[51] Int. Cl. ..............................................H04b 1/16

[58] Field of Search .178/88; 307/231, 294; 325/319, 325/364, 404, 409, 410, 487; 329/101, 189, 192

[56] References Cited

UNITED STATES PATENTS 3,116,453 12/1963 Lennon et al. ......................325/319

3,131,258 4/1964 O'Neill, Jr. ......................325/487 X 3,230,458 1/1966 Strangeland..........................325/410

*Primary Examiner*—Benedict V. Safourek

*Attorney*—Cennamo, Krembias and Foster

[57] ABSTRACT

A modem circuit for distinguishing a frequency shift modulation carrier from noise of a comparable amplitude for use in immediately inhibiting the erroneous response of a data terminal to noise while permitting terminal operation soon after the presence of an acceptable carrier. Noise deadbands are detected and timed and, if 10 milliseconds in duration produce an inhibit output. The inhibit output is maintained for at least 150 milliseconds to permit return of the electromechanical terminal components to a quiescent condition.

3 Claims, 3 Drawing Figures

INVENTOR
EDWIN E. MASON

BY

Cennamo Kremblas & Foster
ATTORNEYS

INVENTOR
EDWIN E. MASON
BY
Cennamo Kremblas & Foster
ATTORNEYS

INENTOR
EDWIN E. MASON

BY

Cennamo Kremblas & Foster
ATTORNEYS

MODEM CARRIER DETECTING CIRCUIT

BACKGROUND OF THE INVENTION

This invention relates generally to data terminal apparatus and more particularly relates to a detector for detecting the presence of a suitable carrier used for frequency shift modulation.

Computer data and other communications are often transmitted over telephone lines, microwave links or other systems by means of frequency shift modulation. The data bits are transmitted in the form of mark and space pulses, the mark being designated by one frequency, the space being designated by another. Data pulses both to and from a terminal are demodulated and modulated respectively by a modem. An input-output typewriter, computer storage or other machine is connected to the modem for receiving demodulated incoming data and for sending outgoing data.

Problems can arise at the computer terminal as a result of noise present at the input of the modem. This noise may arise from various sources such as, for example, atmospheric conditions, telephone switching circuitry, and from terminal switching transients, especially those resulting from electromechanical devices.

It is necessary that a circuit be included in a modem which will distinguish between the presence of noise and the presence of an acceptable carrier. In the case where a data terminal receives a call from a remote terminal, it is necessary that the terminals modem be able to sense the presence of a suitable carrier and to permit operation of its terminal in response to the suitable carrier. If the terminal receives a call from a remote terminal, but the carrier from a remote terminal is not present or ceases, it is then desirable that the modem disconnect the terminal from the data transmission line. Thus, a carrier detector is needed to instruct the modem to begin operations when a proper connection is made between the data terminal and another remote terminal.

However, such a carrier detector must be able to distinguish between an acceptable carrier and noise of a comparable amplitude. Thus, amplitude level detection alone is not sufficient because the noise may be of an amplitude which is comparable to the amplitude of a carrier. In fact, in some instances, the noise level amplitude may exceed the carrier amplitude.

If noise is present at the input of a modem, a carrier detector which detects only amplitude would mistakenly identify the noise as a carrier. The noise would be passed through the demodulator and be decoded causing erroneous print-out at an input-output typewriter or causing erroneous data storage. Because of this possibility, it is desirable that a modem be disabled immediately if the carrier ceases, even if noise of a comparable amplitude is present. Erroneous operation of the I/O typewriter in response to noise is undesirable not only because it represents false and erroneous data but also because the spurious typewriter operation may cause feedback and reexcitation of the carrier detector by erroneous data. It also produces undesirable "chatter" of the electromechanical keyboard.

The carrier detector must not only be able to immediately disable a modem from transmitting incoming data to the typewriter or other machine if a carrier ceases, but additionally it must be able to enable the modem to transmit and receive clean data after the reappearance of a carrier and after the keyboard has settled to a quiescent condition.

There is a need therefore, for a carrier detector which will turn the modem on soon after the presence of a suitable carrier, which will immediately disable the modem from receiving data as soon as noise is detected and maintain it disabled to permit quiescent stability and then which will turn the modem back on as soon as a suitable carrier returns and the terminal no longer is capable of producing transient noises.

SUMMARY OF THE INVENTION

The carrier detecting circuit has an input electronic valve connected to receive the input signal or noise energy and is actuated in response to input energy above minimum level. A first timing circuit has its input connected to the input electronic valve for providing an output reset condition in response to the absence of a minimum input level for a short time period. A second timing circuit receives the output reset signal from the first timing circuit for being reset thereby and also receives the output of the input electronic valve for beginning its longer time delay in response to a minimum input. If the second timing circuit times out before being reset, its output signals the presence of a suitable carrier.

An object of the invention is to provide a carrier detector which will turn a modem on soon after the presence of a suitable carrier, which will immediately disable the modem from receiving or transmitting as soon as a carrier is absent, regardless of the presence of noise, and maintain it disabled to permit the electromechanical components to reach quiescent stability and which will then turn the modem back on soon after a suitable carrier returns and the terminal no longer is capable of producing transient noise.

Figure 1:
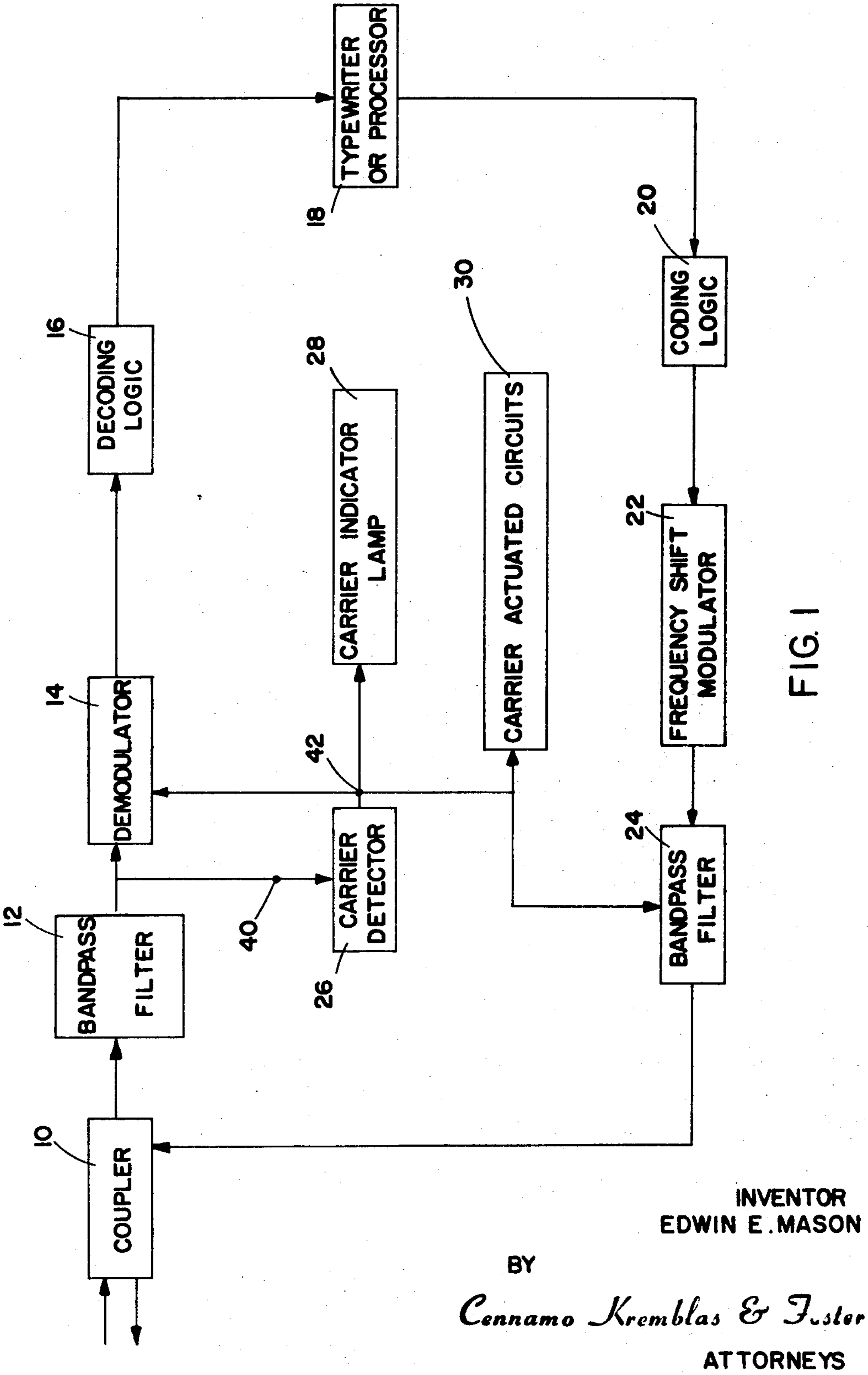
FIG. 1 is a block diagram illustrating the connection of a detecting circuit according to the invention in a modem.

In describing the preferred embodiment of the invention illustrated in the drawings, specific terminology will be resorted to for the sake of clarity. However, it is not intended to be limited to the specific terms so selected. Each specific term includes all technical equivalents. For example, connected is not limited to direct connection but may include connection through another element where functionally equivalent.

DETAILED DESCRIPTION

FIG. 1 is a block diagram illustrating the function of a carrier detector in a typical modem. Data is sent and received over two channels, the lower channel conventionally having a space at 1,070 Hz and a mark at 1,270 Hz. The upper channel has a space of 2,025 Hz and a mark at 2,225 Hz. The mark and space frequencies may be inverted. The modem may send and receive either channel, but when transmitting, one is simultaneously receiving the other.

The modem is coupled to a transmission line by a coupler 10. The signal of the received channel passes through a band-pass filter 12 which omits the transmitted channel and any other frequencies and is then demodulated at demodulator 14. The coded square pulses from the demodulator 14 are decoded in decoding logic 16 and sent an input-output typewriter 18 or other machine for readout processing or storage.

For transmitting, the reverse sequence occurs with data from the typewriter 18 being encoded by coding logic 20 then being modulated by frequency shift modulator 22 and filtered by a band-pass filter 24 to assure transmission of only the proper channel.

The carrier detector 26, which concerns the present invention, receives an input from the output of the band-pass filter 12. The carrier detector 26 signals the demodulator 14 to indicate the presence or absence of an acceptable carrier. With the present invention of enabling DC level of +15 volts to the demodulator indicates the presence of a suitable carrier and enables the demodulator to pass the signal to the decoding logic signal 16. The absence to the suitable carrier will result in a −15 volts for disabling the demodulator 14. This same output from the carrier detector 26 may be used to actuate a carrier indicator lamp 28 and various other carrier actuated circuits 30 as may be desired such as for example, automatic answer logic circuitry for an automatic modem. In addition, the output of the carrier detector is used to enable or disable the transmitting band-pass filter 24. The present invention is therefore primarily concerned therefore with the internal circuitry of the box 26 illustrated in FIG. 1.

Figure 2:
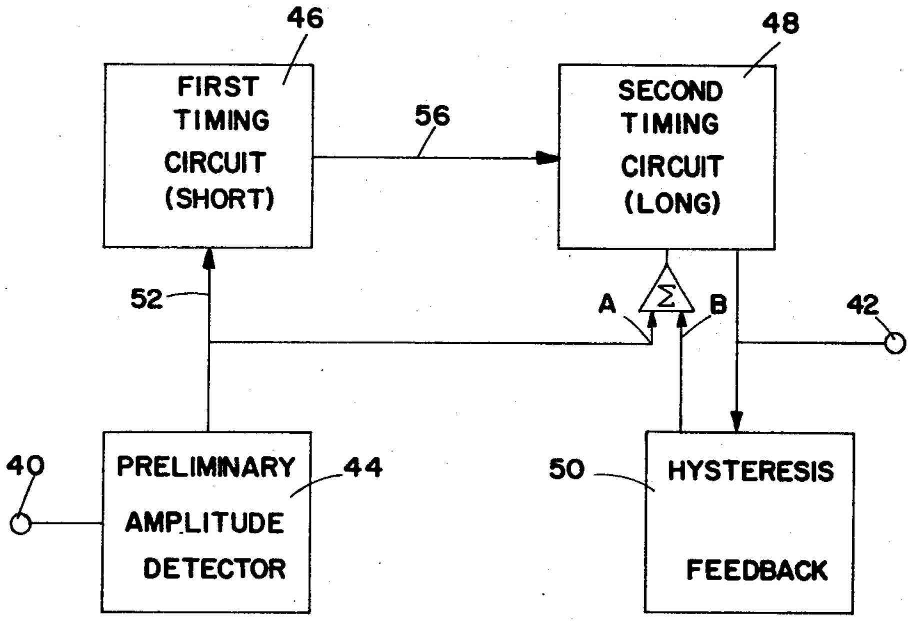
FIG. 2 is a block diagram of an embodiment of the invention.

FIG. 2 illustrates the carrier detector 26 in a block diagram. The input to the carrier detector from the band-pass filter 12 is received at an input terminal 40. The output terminal 42 will be approximately +15 volts to indicate the presence of a suitable carrier and will be approximately −15 volts to indicate the absence of a suitable carrier.

As explained above, because noise amplitude is often comparable to the amplitude of a suitable carrier, it is insufficient to merely detect the presence of an electrical signal at the input 40 which is above a selected level. I have determined however, that noise may be distinguished from a suitable carrier by the presence in noise of deadbands. These are short time intervals of greatly reduced noise energy level. Thus, while a carrier will be continuously present, noise will be varying in amplitude and regardless of its average value, will have intervals of time during which the noise level is well below the carrier amplitude. The circuit of the present invention therefore detects the absence of an electrical signal above minimum level for a selected short period of time and upon detecting the absence of such a signal disables the modem for a selected longer period of time. For example, in the present embodiment illustrated in FIG. 2, the absence of a minimum electrical signal for 10 milliseconds will immediately disable the modem and hold the modem disabled for 150 milliseconds.

Referring to FIG. 2, a carrier signal or noise energy is applied to the terminal 40 from the input band-pass filter 12. This input signal is applied to a preliminary amplitude detector 44. If the alternating carrier signal or the noise is above a minimum level, then pulses of the same fundamental frequency will appear at the output of the preliminary amplitude detector 44. The pulses from the preliminary amplitude detector 44 will be applied to a first short-period timing circuit 46. They will serve to reset this first timing circuit and hold this circuit in its reset condition so long as sufficient pulses are applied at 52.

As used, the term reset means to set a timing circuit to the beginning of its timing sequence. The term set means to initiate the timing sequence of the timing circuit so that it begins timing out. The first timing circuit 46 is therefore held in its reset condition by the input at 52 so long as pulses of sufficient energy are present at the input 52.

The first timing circuit 46 will go to its set condition when the sufficient pulses are absent at the input 52. The first timing circuit will then automatically begin its timing sequence. If the pulses are absent for a period of 10 milliseconds, the first timing circuit 46 will be timed out and will produce a reset signal at its output 56.

The output from the preliminary amplitude detector 44 is also applied to the second long-period timing circuit 48 as a set signal A to begin its timing function. If a sufficient carrier is continuously present at the input 40, the second timing circuit 48 will continue timing for 150 milliseconds and, after this delay, will provide an enabling +15 volts at the output terminal 42. The second timing circuit 48 is reset to the beginning of its timing sequence by a signal from the first timing circuit applied at its input 56. The timing sequence of the long second timing circuit 48 is therefore begun by the presence of a suitable signal at its set input A. After the second timing circuit has timed out for its 150 milliseconds delay an enabling level at +15 volts will appear at the output terminal 42. Whenever the second timing circuit is reset, the output at 42 will become a disabling voltage of −15 volts. Thus, each time a reset is applied at 56 to the second timing circuit 48, the output terminal 42 goes to its disabling − 15 volts. On the other hand, 150 milliseconds after the set signal is applied, the second timing circuit 48 will time out and apply a +15 volts for enabling the modem circuitry.

A hysteresis feedback circuit 50 is connected to the output 2425 from the second timing circuit 48 to provide an additional setting signal B into the second timing circuit. The setting signal B is summed with the signal A. The function of the B setting signal is to maintain the second timing circuit 48 in its on (set) output condition even if the A setting signal 54 becomes insufficient to along hold the second timing circuit in the on (set) output condition. Holding the second timing circuit in its set condition holds the output terminal at the enabling +15 volts.

If at any time the output 52 from the preliminary amplitude detector 44 is nonexistent, the first timing circuit 46 will begin its timing interval. If the output from the preliminary amplitude detector 44 is absent for a period of 10 milliseconds than a reset signal will be sent from the first timing circuit 46 to the second timing circuit 48 to immediately reset the second timing circuit 48 and thereby switch the output 42 to the disabling voltage of −15 volts. The output will remain in this condition for at least 150 milliseconds. If an acceptable carrier appears at the input 40 at any time within the 150 millisecond interval and continues, then, after the expiration of the 150 milliseconds interval, the second timing circuit will again turn the output to the +15 volts enabling condition.

Thus, every time a deadband occurs at the input 40 and there is no carrier signal, the first timing circuit 46 will time the deadband and reset the second timing circuit 48. If no carrier and no noise energy are present for a very long period of time the second timing circuit be held in its reset condition. If the noise continues with its intermittant deadbands, the second timing circuit will be reset each time such a deadband occurs such that it will never be able to time out and give a +15 enabling output.

An advantage of this circuit is that the carrier amplitude necessary to initiate the timing sequence of the second timing circuit 48 is greater than the carrier amplitude necessary to maintain the output 42 in the +15 volt enabling condition. This is true because, initially, the carrier, when applied to the preliminary amplitude detector 44 and through that to the set A terminal of the second timing circuit 48, must alone be sufficient to set the second timing circuit 48 and begin its timing. However, after an output of +15 volts at terminal 42 is accomplished, the hysteresis feedback circuit 50 contributes set signal to the set conditions for the second timing circuit 48. Thus, if the carrier amplitude falls somewhat after there is a +15 enabling volts at the output 42, the B set input will help maintain the second timing circuit in its set condition.

Figure 3:
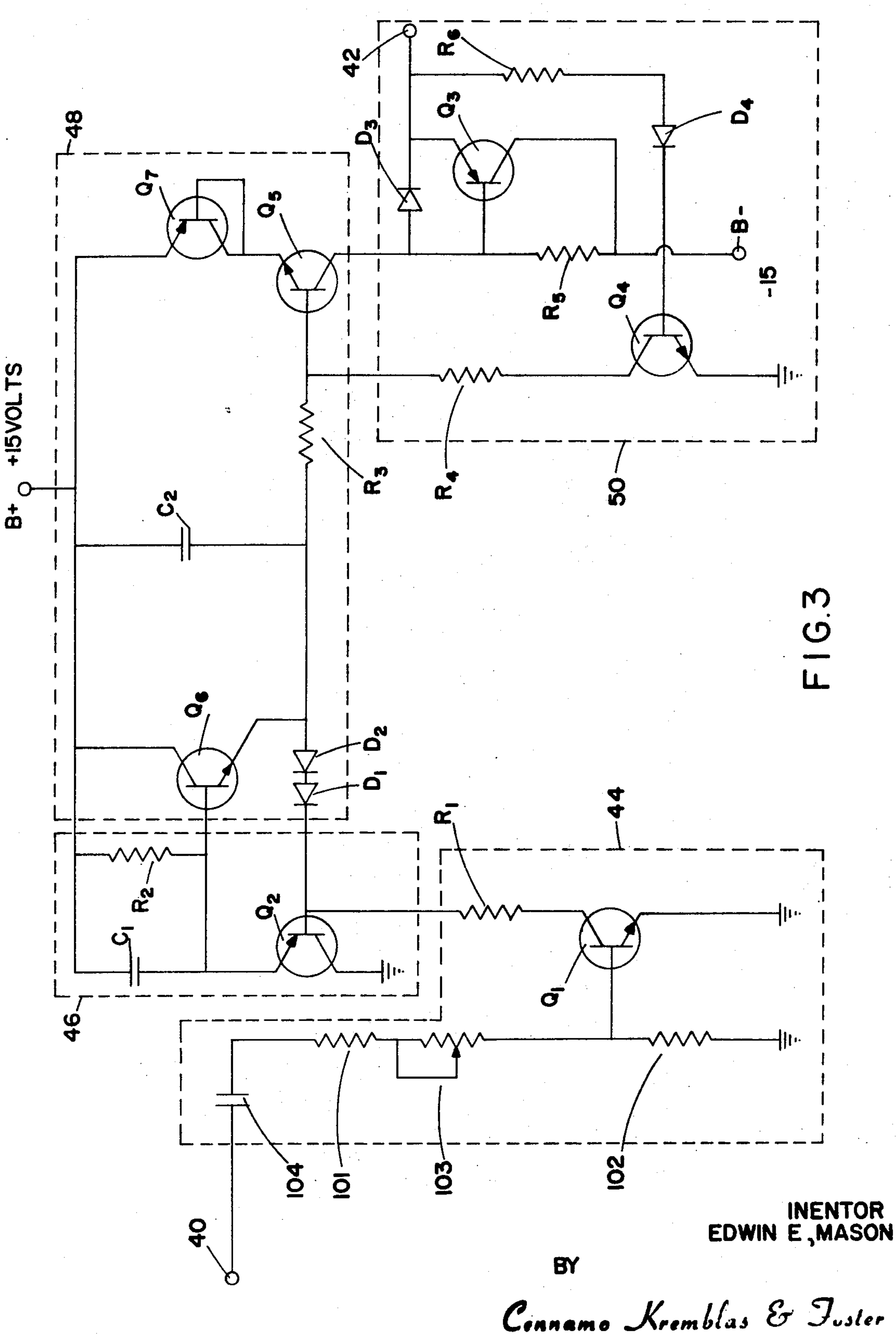
FIG. 3 is a schematic diagram of a preferred embodiment of the invention.

Referring now to the detailed schematic of FIG. 3, the preliminary amplitude detector 44 comprises a transistor $Q_1$ operating as an input electronic valve. The input signal to the transistor $Q_1$ is derived from a voltage divider comprising resistance 101 and resistance 102 and variable resistance 103. The input signal is coupled from the input terminal 40 by a coupling capacitor 104. A collector resistance $R_1$ having a value, for example, of 100 K ohms connects the collector of the transistor $Q_1$ to the first timing circuit 46 and the second timing circuit 48. The transistor $Q_1$ will begin conducting whenever a carrier signal or noise energy of a sufficient amplitude is applied to the base of the transistor $Q_1$.

The first timing circuit 46 comprises a second transistor $Q_2$ operating as a second electronic valve which is series connected to a timing capacitor $C_1$. A second resistor $R_2$ is shunted across the timing capacitor $C_1$. Generally, whenever the transistor $Q_1$ begins conducting the transistor $Q_2$ is turned on to charge the capacitor $C_1$. This is a reset of the first timing circuit 46. The absence of pulses of suitable amplitude at the input transistor $Q_1$ will turn the transistor $Q_2$ off and thereby setting the first timing circuit 46 to initiate the timing cycle. The absence of conduction in the transistor $Q_1$ puts the first timing circuit 46 to the set condition.

The second timing circuit 48 comprises a timing capacitor $C_2$ shunted by a transistor $Q_6$ operating as an electronic switch. A pair of diodes D1 and D2 connect the second timing circuit 48 to the output of the preliminary amplitude detector 44 at the collector resistance $R_1$. Described briefly, the second timing circuit 48 is set and thus its timing cycle is initiated whenever the transistor $Q_1$ begins conducting sufficiently. With transistor $Q_1$ conducting, the transistor $Q_6$ turns off and the capacitor $C_2$ begins charging until an output transistor $Q_5$ begins conduction. When the transistor $Q_5$ begins conduction, the output terminal 42 goes to +15 volts to enable the modem circuit. The second timing circuit 48 is reset whenever, due to an absence of pulses at $Q_1$, the first timing capacitor $C_1$ discharges sufficiently to turn on the transistor $Q_6$ and discharge the second timing capacitor $C_2$. Sufficient discharge of the second timing capacitor $C_2$ turns off the transistor $Q_5$ moving the output terminal 42 to a −15 volts for disabling the modem.

The hysteresis feedback circuit 50 comprises a diode $D_3$ connecting the collector of the transistor $Q_5$ to the output terminal 42. A transistor $Q_3$ has its input connected across this diode and functions to help pull the output terminal 42 to the −15 volts whenever the transistor $Q_5$ begins to turn off. A transistor $Q_4$ has its base input connected by a diode $D_4$ and through a resistance $R_6$ to the output terminal 42. Its function is to aid and speed the charging to the output voltage at the terminal 42 to +15 volts by supplying additional base current to aid turning on of the transistor $Q_5$.

A detailed consideration of the operation of the circuit of FIG. 3 would begin with no carrier signal or noise energy present at input terminal 40 and therefore with the transistor $Q_1$ non-conducting. With the transistor $Q_1$ non-conducting, the transistor $Q_2$ is likewise non-conducting, the first timing capacitor $C_1$ is discharged and therefore the base of the transistor $Q_6$ is effectively connected through the resistance $R_2$ to a source of base current. Therefore, in this condition the transistor $Q_6$ is conducting and is capable of discharging the second timing capacitance $C_2$ to a voltage of approximately 0.6 volts. Because of the connection of a diode-connected transistor $Q_7$ to the emitter of the transistor $Q_5$, a voltage of 0.6 volts on the capacitor $C_2$ will be insufficient to bring the transistor $Q_5$ into conduction. Therefore, in the condition with no energy input at the input terminal 40, the transistor $Q_5$ is non-conducting. In this condition the diode $D_3$ is reversed biased, the transistor $Q_3$ is conducting and the output terminal 42 is effectively connected to the B− supply voltage of −15 volts. Thus, with no input energy at the input terminal 40, the output terminal 42 is at the −15 disabling voltage.

Any carrier signal or noise energy which appears at the input terminal 40 and which is insufficient to bring the input transistor $Q_1$ into conduction, will have no effect upon the circuit conditions. The minimum input amplitude necessary to turn on the transistor $Q_1$ and therefore the sensitivity of the circuit is selectively adjusted by the adjustable resistor 103.

Any input energy above the selected level will bring the transistor $Q_1$ into conduction. The initial effect of the conduction of $Q_1$ will be to turn on transistor $Q_2$. The initial collector current of $Q_1$ will flow through the base-emitter junction of $Q_2$ and be added to the collector current of $Q_2$ to aid in the immediate charging of the first timing capacitor $C_1$. Initially, the diodes $D_1$ and $D_2$ are reversed biased. However, when the capacitor $C_1$ accumulates a sufficient charge such that the voltage across the capacitor $C_1$ when added to the base to emitter junction voltage of the transistor $Q_2$ exceeds the sum of the collector to emitter voltage of the transistor $Q_6$ plus the two junction voltages of the diodes $D_1$ and $D_2$, then the diodes $D_1$ and $D_2$ will be forward biased and become conducting. The charge on the first timing capacitor $C_1$ will turn off the transistor $Q_6$ and current flows through the collector of the transistor $Q_1$, through the diodes $D_1$ and $D_2$ to begin charging the capacitor $C_2$. For a carrier signal of ordinary strength, the forward biasing of the diodes $D_1$ and $D_2$ is consequently the beginning of the charging of the capacitor $C_2$ is nearly immediately after transistor $Q_1$ begins conducting.

When the second timing capacitor $C_2$ begins charging, most of the current through the collector of transistor $Q_1$ and through the diodes $D_1$ and $D_2$ flows to charge the capacitor $C_2$. However, as the capacitor $C_2$ accumulates charge, a portion of the current through the diodes $D_1$ and $D_2$ is diverted through the base to emitter junction of the transistor $Q_5$. As the capacitor $C_2$ accumulates charge, the base current of transistor $Q_5$ increases until finally the transistor $Q_5$ begins conducting. The time delay from the initiation of the charging of the capacitor $C_2$ until the transistor $Q_5$ begins conducting is designed to be 150 milliseconds. In this 150 millisecond delay, the capacitor $C_2$ charges from from approximately 0.6 volts to approximately 1.2 volts.

As soon as the transistor $Q_5$ begins conducting, the anode of the diode $D_3$ is effectively connected to the +15 B+ supply. This effectively forward biases the diode $D_3$ and connects the output terminal 42 to the +15 volts.

In reality, of course, the switching of the transistor $Q_5$ from a non-conducting to a conducting state takes a finite amount of time. One function of the hysteresis feedback circuit 50 is to speed up the time for the output terminal 42 to go from a −15 to a +15 volts. This is accomplished by this circuit because as soon as the collector of the transistor $Q_5$ is at least at +0.6 volts with respect to the cathode of the diode $D_3$, the diode $D_3$ will be forward biased thus turning the transistor $Q_3$ off. When the output terminal 42 is at least at +1.2 volts with respect to ground, the transistor $Q_4$ will begin conducting and will therefore increase the amount of base current supplied to the transistor $Q_5$ to aid and speed up the bringing of the transistor $Q_5$ into conduction.

So long as the input signal at the terminal 40 is present and continuous and above a minimum value the transistor $Q_1$ will continue conducting, the transistor $Q_2$ will be maintained in an on condition, the first timing capacitor $C_1$ will be maintained in its reset, fully charged condition and the transistor $Q_6$ will be held non-conducting. Additionally, the second timing capacitor $C_2$ will be held in its fully recharged set condition and the transistor $Q_5$ will continue conducting. The transistor $Q_4$ will continue to add its collector current to the current through the collector of the transistor $Q_1$ and the diodes $D_1$ and $D_2$ providing total the base current for the transistor $Q_5$. In this condition, the output terminal 42 is held at +15 volts to enable the operation of the modem.

If now for any reason, the input power at the terminal 40 would become insufficient to hold the transistor $Q_1$ in the conducting state, the circuit condition will begin the change. Such an insufficiency of power input may result from the discontinuance or substantial reduction of a carrier in the absence of noise energy or may result from the beginning of a noise deadband defined as above in the absence of a carrier. In either case, if the input energy is insufficient to maintain the transistor $Q_1$ in conduction then the transistor $Q_1$ will cease conducting, thus turning off the transistor $Q_2$ to a non-conducting state. With transistor $Q_2$ non-conducting, the capacitor $C_1$ will begin discharging. When the capacitor $C_1$ has sufficiently discharged to raise the base voltage of the transistor $Q_6$, the transistor $Q_6$ will begin conducting and will thus discharge the second timing capacitor $C_2$ to reset the second timing circuit 48. Discharge of the second timing capacitor $C_2$ will reduce the base voltage of the transistor $Q_5$ and turn if off to a non-conducting condition.

The transistor $Q_4$ together with its resistor $R_4$ is designed to supply by itself an insufficient base current to maintain the transistor $Q_5$ in conduction. Only when the transistor $Q_5$ base current includes current through the resistor $R_3$ from the collector of the transistor $Q_1$ will there be sufficient base current to maintain the transistor $Q_5$ in condition.

The time period from the initiation of the discharge of the first timing capacitor $C_1$ until it has discharged sufficiently to turn on the transistor $Q_6$ is a short time delay of, for example, 10 milliseconds. If prior to the expiration of the 10 millisecond interval, a sufficient signal resumes at the input terminal 40 to turn the transistor $Q_1$ back to its conducting state, the capacitor $C_1$ will be recharged and thus the first timing circuit 46 will be immediately reset without any further effect upon the circuit and without any change in the voltage at the output terminal 42. If however, no signal appears within the 10 millisecond time interval such as would occur at a noise deadband or at the termination of communications from a remote terminal, the capacitor $C_1$ will discharge sufficiently to bring the transistor $Q_6$ into conduction. Thus, the first timing circuit is reset whenever a signal of sufficient energy to turn on $Q_1$ appears at the base of $Q_1$. The first timing circuit 46 is set and thus the timed discharge of $C_1$ begun whenever a sufficient signal is absent from the transistor $Q_1$ and the transistor $Q_1$ goes to a non-conducting state.

When the transistor $Q_6$ is turned on after the decay of charge on the first timing capacitance $C_1$, the second timing capacitance $C_2$ is nearly immediately discharged and the second timing circuit 48 is almost immediately reset. Thus, once the second timing circuit 48 has been reset as a result of at least a 10 millisecond deadband, than at least another 150 milliseconds must elapse before the transistor $Q_5$ again begins conducting. This means of course, that the modem is disabled after any deadband for at least 150 milliseconds. If the deadband was from an intermittent failure or loss of the carrier, then approximately two data bits will remain unprinted rather than erroneous data being printed. If the deadband is a result of a deadband occurring in noise, then the circuit will have 150 milliseconds in which to sense another noise deadband. Since the noise deadband occur at least twice in every 150 millisecond period, the circuit recognizes noise and maintains the modem disabled by continuing to reset the second timing circuit 48 by discharging the capacitor $C_2$ before the second timing circuit 48 can complete its 150 milliseconds time delay. In the presence of noise, the transistor $Q_5$ is continuously held in a non-conducting state to disable modem operation.

If the deadband was the end of communication with another data terminal, then the modem is immediately disabled to prevent erroneous printing and "chatter" from the setting of the electromechanical components to a quiescent condition.

In a similar manner, as described above, the turning off of the transistor $Q_5$ will require a finite amount of time and is aided by the operation of the hysteresis feedback circuit 50. When the transistor $Q_5$ is going from conduction toward non-conduction, the collector of the transistor $Q_5$ will be going toward −15 volts. As soon as the collector voltage of the transistor $Q_5$ is sufficiently negative to reverse bias the diode $D_3$ and as soon as the base of the transistor $Q_3$ is at least −0.6 volts with respect to its emitter, the transistor $Q_3$ will begin conducting and effectively connect the output terminal 42 to the −15 volts B−. This provides a −15 volt disabling voltage at the output terminal 42. In addition, as the output voltage at the terminal 42 is moving from a +15 to a −15 volts, when it is less than +1.2 volts, the transistor $Q_4$ will cease conducting. This will further deprive the transistor $Q_5$ of some of its base current thereby speeding its transition from a conducting to a non-conducting state. Thus, the presence of insufficient energy at the input to the transistor $Q_1$ to maintain the transistor $Q_1$ in an on condition results in a −15 disabling volts at the output terminal 42.

Of course, carrier energy and noise energy are not always either sufficiently large to drive the transistor $Q_1$ into saturation or sufficiently small to leave it entirely non-conducting. An additional advantage of my circuit is its hysteresis effect. A sign of moderate strength which may be sufficient to drive the transistor $Q_1$ into its linear conduction region but not into saturation, can be detected by the circuit. The circuit operates so that a carrier of a given selected amplitude is necessary to switch its output from disabling −15 volts to an enabling +15 volts. But the circuit can be maintained in its +15 volt enabling output condition with the carrier at a reduced level. The circuit therefore avoids intermittent on and off operation from a carrier in which the average energy applied to the circuit input may vary somewhat with time around the sensitive level. If a carrier is of sufficient energy to enable the modem, the modem may subsequently operate with a somewhat decreased carrier level.

This is accomplished basically by the summing of base current in the transistor $Q_5$. If a carrier is present, which is sufficient in energy to charge the capacitance $C_1$ as described above so that the transistor $Q_6$ is turned off and if it is of sufficient energy, averaged over a short period of time, to supply sufficient base current to the transistor $Q_5$ to once bring it into conduction, then additional base current is supplied to the transistor $Q_5$ through the transistor $Q_4$. After the transistor $Q_4$ begins aiding to supply base current to the transistor $Q_5$, the current through the transistor $Q_1$ may be somewhat reduced due to a reduction in carrier level. It may be reduced below the level which was necessary to turn the transistor $Q_5$ to its on condition in the first place. While some subsequent reduction in carrier energy is permitted, the transistor $Q_4$ does not supply sufficient base current to the transistor $Q_5$ to alone maintain the transistor $Q_5$ in conduction. Thus, the transistor $Q_1$, if the input signal energy is reduced enough, will still have its collector current sufficiently reduced that the capacitance $C_1$ will discharge to reset the second timing circuit 48. Once this occurs, the output goes to a −15 disabling volts as described above.

Any energy applied in the input terminal 40 is of course actually an alternating source and only its positive going excursions can turn the transistor $Q_1$ to an on condition. Its negative excursions always turn the transistor $Q_1$ off. Thus, in reality, the capacitors $C_1$ and to some extent $C_2$ charge and discharge in sawtooth fashion during each cycle of input energy. Thus, a very weak carrier may have extreme excursions sufficient to turn the transistor $Q_1$ on for a very short interval and apply some charge to the capacitor $C_1$. However, for such weak carriers, and similarly for extraneous noise spikes, the capacitor will discharge, during the half cycle the transistor $Q_1$ is off, an amount at least equal to the charge it accumulated while the transistor $Q_1$ was on. Only when the transistor $Q_1$ is on with a long enough duty cycle will charge actually be accumulated on the capacitances $C_1$ and $C_2$. Of course, with the transistor $Q_6$ non-conducting the capacitor $C_2$ would have a relatively long time constant for its discharge.

It is to be understood that while the detailed drawings and specific examples given described a preferred embodiment of the invention, they are for the purposes of illustration only, the Apparatus of the invention is not limited to the precise details and conditions disclosed and that various changes may be made therein without departing from the spirit of the invention which is defined by the following claims:

I claim:

1. A carrier detector circuit for detecting the presence of an acceptable data carrier for controlling a data terminal and comprising:

a. an input circuit means comprising a voltage divider for having the input signal applied thereto, and an input transistor having its input connected to the divider, one output terminal of said input transistor being connected to a source of DC power;

b. a first timing circuit means comprising a first capacitance connected parallel to a first resistance and series connected to a first transistor switch and a source of DC power, the control input terminal of said first transistor switch being connected to the other output terminal of said input transistor;

c. a second timing circuit means comprising a second capacitance connected to a source of DC power and to said other output terminal of said input transistor, said second timing circuit means also having a discharging second transistor switch having its switch terminals connected across said second capacitance, the control input terminal of said second transistor switch being connected between said first capacitance and the first transistor switch of the first timing circuit means and said second timing circuit means also having an output transistor switch having its control input terminal connected at a node between said second capacitance and said input transistor, a switching terminal of said output transistor switch connected to the output terminal of said detector circuit; and d. a speed up circuit connected to said output transistor switch for speeding its transition from one state to the other, the speed up circuit further comprising: a first speed up transistor having its switching terminals connected to said source of DC power and to the control input of said output transistor switch for supplying additional turn on current to said output transistor switch shortly after said output transistor switch begins its transition, the speedup transistor having its control input terminal connected to said output terminal of the detector circuit.

2. A circuit according to claim 1 wherein a. a first diode is interposed between the control input terminal of the first speed up transistor and said output terminal in a polarity to permit current flow to said control terminal;

b. a second diode is interposed between said output terminal and said output transistor switch in a polarity to be forward biased when said output transistor is conducting; and c. a second speed up transistor having its switching terminals connected between said output terminal and a source of DC power and having its control input terminal connected to the output transistor switch side of said second diode.

3. A carrier detector circuit for detecting the presence of an acceptable data carrier for controlling a data terminal and wherein there is provided a positive DC supply terminal, a negative DC supply terminal and a ground terminal and comprising:

a. an input electronic valve means comprising a voltage divider capacitively coupled at one end to receive a carrier input signal and having its other end connected to said ground terminal, and an input NPN transistor having its emitter connected to ground, its base connected to an intermediate node of the voltage divider and its collector connected to one end of a current limiting resistance;

b. a first timing circuit means comprising a first PNP transistor having its collector connected to said ground terminal, its base connected to the other end of said current limiting resistance and its emitter connected to one end of said first capacitance; a discharge timing resistance connected parallel to said first capacitance; and wherein the other terminal of said capacitance is connected to said positive supply terminal;

c. a second timing circuit means comprising a second NPN transistor having its collector connected to said positive supply terminal, its base connected to the emitter of said first PNP transistor and its emitter connected through at least one diode to said other end of said current limiting resistance; and said second timing circuit means including an output electronic switch which is a third NPN transistor having its emitter connected to said positive supply terminal through voltage reference diode, having its base connected to the base of said second NPN transistor through a base resistance and having its collector connected to the output terminal of said carrier detecting circuit; and d. a speed up circuit connected to said output transistor switch for speeding its transition from one state to the other, the speed up circuit further comprising: a first speed up transistor having its switching terminals connected to said source of DC power and to the control input of said output transistor switch for supplying additional turn on current to said output transistor switch shortly after said output transistor switch begins its transition, the speedup transistor having its control input terminal connected to said output terminal of the detector circuit wherein a first diode is interposed between the control input terminal of the first speed up transistor and said output terminal in a polarity to permit current flow to said control terminal; a second diode is interposed between said output terminal and said output transistor switch in a polarity to be forward biased when said output transistor is conducting; and a second speed up transistor having its switching terminals connected between said output terminal and a source of DC power and having its control input terminal connected to the output transistor switch side of said second diode.

* * * * *